United States Patent
Grant

(10) Patent No.: US 10,007,246 B2
(45) Date of Patent: Jun. 26, 2018

(54) MACHINING TOOL UTILIZING A SUPERCRITICAL COOLANT

(71) Applicant: Marion Billingsley Grant, Princeville, IL (US)

(72) Inventor: Marion Billingsley Grant, Princeville, IL (US)

(73) Assignee: Caterpillar Inc., Deerfield, IL (US)

( * ) Notice: Subject to any disclaimer, the term of this patent is extended or adjusted under 35 U.S.C. 154(b) by 776 days.

(21) Appl. No.: 14/558,167

(22) Filed: Dec. 2, 2014

(65) Prior Publication Data

US 2016/0151871 A1 Jun. 2, 2016

(51) Int. Cl.
| | |
|---|---|
| B23B 27/10 | (2006.01) |
| G05B 19/18 | (2006.01) |
| B23Q 11/10 | (2006.01) |

(52) U.S. Cl.
CPC ............ G05B 19/182 (2013.01); B23B 27/10 (2013.01); B23Q 11/1053 (2013.01); G05B 2219/49049 (2013.01); G05B 2219/49322 (2013.01)

(58) Field of Classification Search
CPC ..... B23B 27/10; B23Q 11/10; B23Q 11/1061; B23Q 11/1053; B23Q 11/1046; B23Q 11/126
See application file for complete search history.

(56) References Cited

U.S. PATENT DOCUMENTS

| | | |
|---|---|---|
| 522,588 A | 7/1894 | Chouteau |
| 3,077,802 A | 2/1963 | Philip |
| 3,260,244 A * | 7/1966 | Blaskowski ............... F01K 3/18 122/33 |
| 3,889,520 A | 6/1975 | Stoferle et al. |
| 3,971,114 A * | 7/1976 | Dudley .................... B23B 27/10 407/120 |
| 4,012,212 A | 3/1977 | Kniel |
| 4,535,216 A | 8/1985 | Cassidenti |
| 4,829,859 A | 5/1989 | Yankoff |
| 5,237,894 A * | 8/1993 | Lindeke .................. B23B 27/10 407/11 |
| 5,340,242 A | 8/1994 | Armbrust et al. |
| 5,718,156 A | 2/1998 | Lagrolet et al. |
| 5,901,623 A * | 5/1999 | Hong ...................... B23B 27/10 407/100 |
| 6,053,669 A | 4/2000 | Lagerberg |
| 6,443,672 B1 | 9/2002 | Lagerberg |
| 6,637,984 B2 | 10/2003 | Murakawa et al. |
| 6,652,200 B2 | 11/2003 | Kraemer |

(Continued)

FOREIGN PATENT DOCUMENTS

| | | |
|---|---|---|
| DE | 3004166 A | 8/1980 |
| DE | 3740814 A | 6/1989 |

(Continued)

*Primary Examiner* — Will Fridie, Jr.

(74) *Attorney, Agent, or Firm* — Finnegan, Henderson, Farabow, Garrett & Dunner, LLP; John Wappel

(57) ABSTRACT

A machining tool is provided having an insert that includes one or more interface surfaces configured to interact with a workpiece. The machining tool also has one or more distribution passages located within the insert. The one or more distribution passages are situated and sized to direct a fluid to the one or more interface surfaces while maintaining the fluid above a pressure at which the fluid exists in a supercritical state.

20 Claims, 3 Drawing Sheets

(56) References Cited

U.S. PATENT DOCUMENTS

| | | |
|---|---|---|
| 6,769,335 B2 | 8/2004 | Kaminski |
| 7,252,024 B2 | 6/2007 | Zurecki et al. |
| 7,337,879 B2 * | 3/2008 | Jager .................. B23B 51/06 184/6.21 |
| 7,607,898 B2 | 10/2009 | Noble et al. |
| 7,634,957 B2 * | 12/2009 | Ghosh .................. B23B 27/10 82/1.11 |
| 8,701,529 B2 * | 4/2014 | Deschenaux ........ B23B 27/045 407/11 |
| 8,926,858 B2 * | 1/2015 | Jackson ............ B23Q 11/1053 252/71 |
| 2001/0007215 A1 | 7/2001 | Murata et al. |
| 2002/0189413 A1 | 12/2002 | Zurecki et al. |
| 2004/0234350 A1 | 11/2004 | Jager et al. |
| 2004/0240949 A1 | 12/2004 | Pachao-Morbitzer et al. |
| 2005/0011201 A1 | 1/2005 | Zurecki et al. |
| 2005/0211029 A1 | 9/2005 | Zurecki et al. |
| 2006/0053987 A1 | 3/2006 | Ghosh et al. |
| 2006/0123801 A1 | 6/2006 | Jackson |
| 2006/0140728 A1 | 6/2006 | Giannetti |
| 2006/0247139 A1 * | 11/2006 | Skerlos ............ B23Q 11/1053 508/154 |
| 2006/0263153 A1 | 11/2006 | Isaksson |
| 2007/0286689 A1 | 12/2007 | Giannetti |
| 2008/0175676 A1 | 7/2008 | Prichard et al. |
| 2008/0175677 A1 | 7/2008 | Prichard et al. |
| 2009/0320655 A1 * | 12/2009 | Grant .................. B23B 27/10 82/50 |
| 2011/0027021 A1 | 2/2011 | Nelson et al. |
| 2011/0027024 A1 | 2/2011 | Prichard et al. |
| 2012/0237311 A1 * | 9/2012 | Dionne ............ B23Q 11/1061 409/135 |
| 2014/0353406 A1 * | 12/2014 | Kapoor ................ B05B 7/0075 239/379 |
| 2015/0037110 A1 * | 2/2015 | Wunderlich ............ B23Q 5/04 408/1 R |
| 2015/0251288 A1 * | 9/2015 | Kudaravalli ....... B23Q 11/1053 407/11 |

FOREIGN PATENT DOCUMENTS

| | | |
|---|---|---|
| EP | 100376 A2 | 2/1984 |
| EP | 599393 A1 | 6/1994 |
| JP | 56069007 A | 6/1981 |
| JP | 04183503 A | 6/1992 |
| JP | 05301104 A | 11/1993 |
| JP | 08039387 A | 2/1996 |

\* cited by examiner

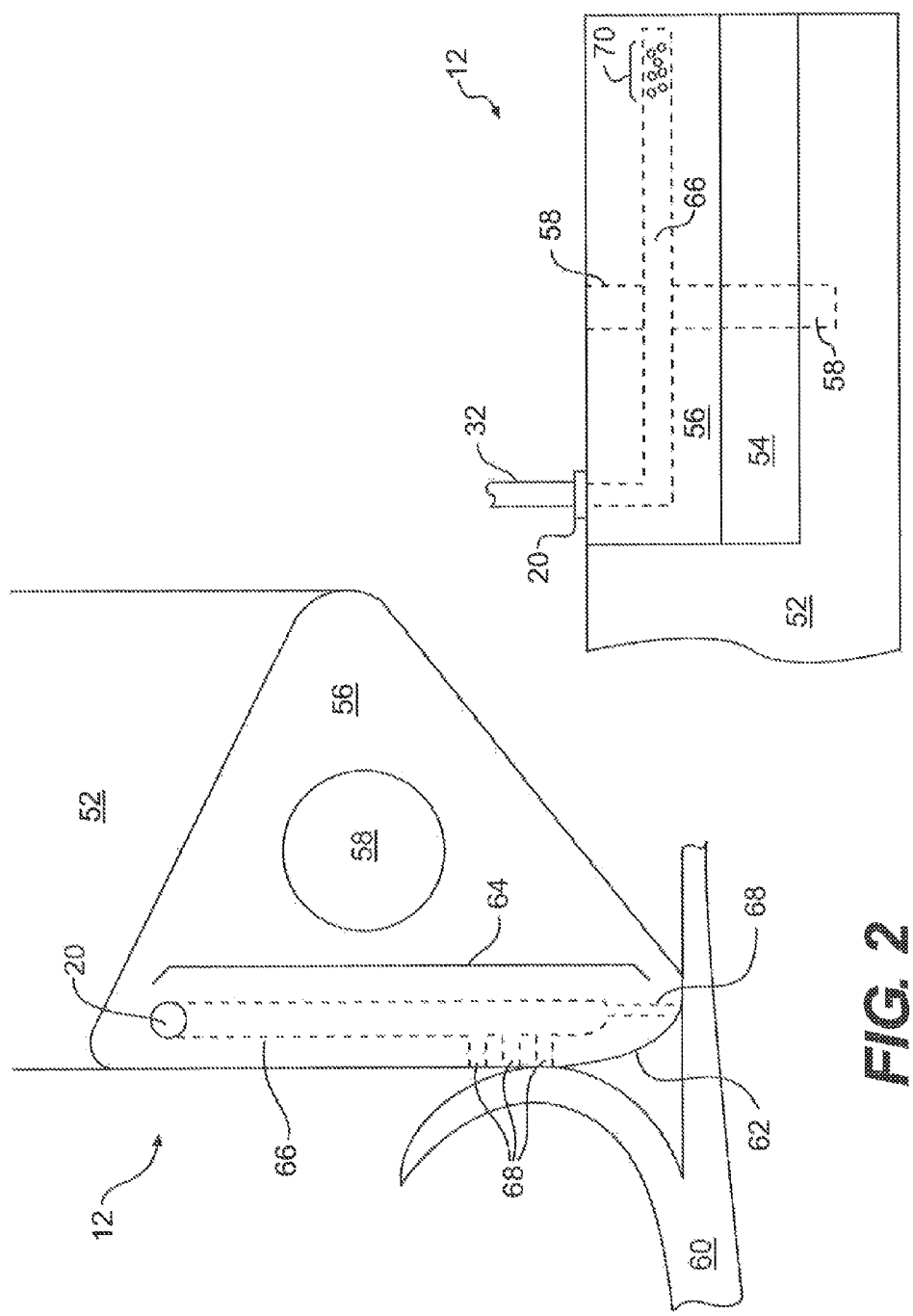

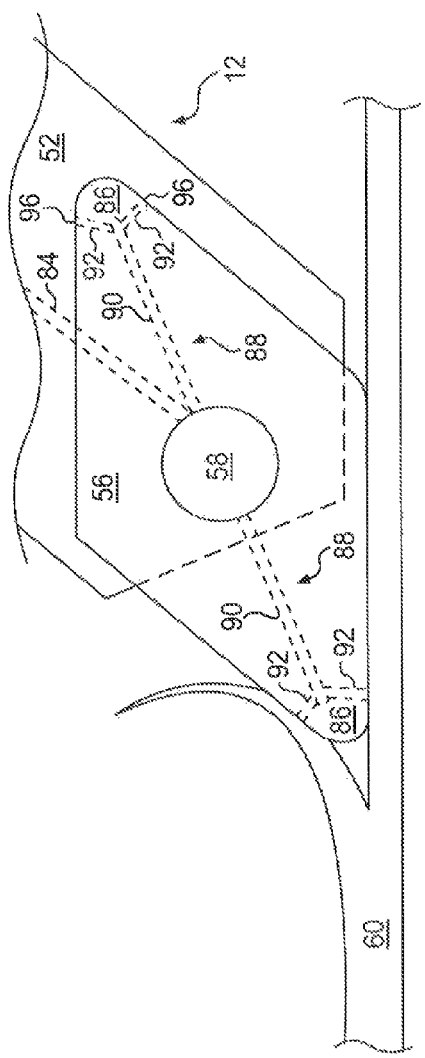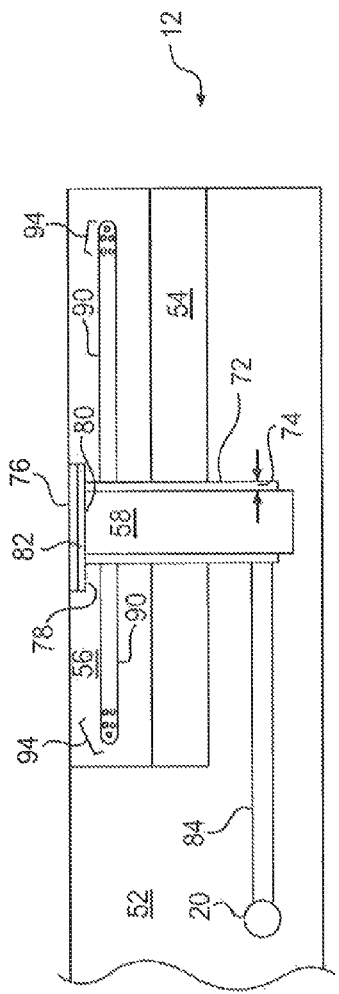
FIG. 4
FIG. 5

MACHINING TOOL UTILIZING A SUPERCRITICAL COOLANT

This application is a divisional of U.S. patent application Ser. No. 12/216,122, filed Jun. 30, 2008, which is incorporated herein by reference.

TECHNICAL FIELD

The present disclosure is directed to a machining tool and, more particularly, to a machining tool utilizing a cryogenic lubricant.

BACKGROUND

Before a workpiece is combined with other workpieces to form an assembly, it is typically machined to a desired shape and dimension. Often, such a machining process is performed by a cutting tool, which modifies the component by removing material from a surface of the workpiece. This material removing process is achieved by moving a cutting edge of the tool along a surface of the workpiece at a particular velocity and depth. As the cutting edge moves along the surface, workpiece material is sheared along a shear plane to form a chip. Frictional forces resulting from the movement of the cutting edge across the surface of the workpiece can generate a significant amount of heat, which may contribute to wear on the cutting tool and/or may damage the workpiece.

One attempt to reduce the amount of heat generated by the frictional forces is disclosed in U.S. Publication No. US2006/0123801 (the publication), by Jackson on Jun. 15, 2006. The publication describes a cutting tool having axially bored channels running the length of the tool and terminating prior to a cutting edge. In addition, each channel includes a free floating capillary tube. A coolant such as solidified carbon dioxide ($CO_2$) particles is directed through each capillary tube while a propellant such as $CO_2$ gas is directed between the inner walls of the channel and the outer walls of the capillary tube. Either at or prior to the interface between the cutting tool and the workpiece, the coolant and propellant are mixed together to form a cryogenic spray that cools and lubricates the interface between the cutting tool and the workpiece.

Although the cryogenic spray disclosed in the publication may lubricate and cool the interaction between the cutting tool and the workpiece, its effectiveness may be limited. In particular, the configuration of the cutting tool requires directing two different fluid streams through the tool and mixing the streams prior to the interface between the cutting tool and the workpiece without any feedback that may be used to adjust the mixture. Such a configuration increases the complexity of the system because it may be difficult to maintain a consistent mixture composition without any feedback. For example, the percentage of the mixture that includes the coolant may vary throughout the cutting process. Such a variance in the composition of the mixture can make the lubricating and cooling properties of the mixture unpredictable.

Additionally, the efficiency of the cryogenic spray disclosed in the publication may be reduced because the cryogenic spray is directed through the shank of the cutting tool and not through the cutting insert. In this configuration, the coolant delivery point is located away from the interface between the tool and the workpiece. While traveling through the space between the delivery point and the interface, the temperature of the cryogenic spray may increase before reaching the interface. Furthermore, currents in the ambient air surrounding the tool and workpiece may direct some of the cryogenic spray away from the interface. Therefore, more cryogenic fluid may be needed to obtain a desired lubrication and temptation.

The disclosed system is directed to overcoming one or more of the problems set forth above.

SUMMARY

In one aspect, the present disclosure is directed to a machining tool. The machining tool includes an insert having one or more interface surfaces configured to interact with a workpiece. The machining tool also includes one or more distribution passages located within the insert. The one or more distribution passages are situated and sized to direct a fluid to the one or more interface surfaces while maintaining the fluid above a pressure at which the fluid exists in a supercritical state.

In another aspect, the present disclosure is directed to a method for machining a workpiece. The method includes manipulating a fluid to be in a supercritical state. The method also includes directing the fluid through an insert of a machining tool while maintaining the fluid in the supercritical state. In addition, the method includes using the insert to remove a portion of the workpiece. The method further includes directing the fluid to an interface surface of the insert that is interacting with the workpiece while maintaining the fluid in the supercritical state.

BRIEF DESCRIPTION OF THE DRAWINGS

FIG. 2 is a top view of an exemplary machining tool and workpiece;

FIG. 3 is a side view of the exemplary machining tool of FIG. 2;

FIG. 4 is a top view of another exemplary machining tool and workpiece; and

FIG. 5 is a side view of the exemplary machining tool of FIG. 4.

DETAILED DESCRIPTION

Figure 1:
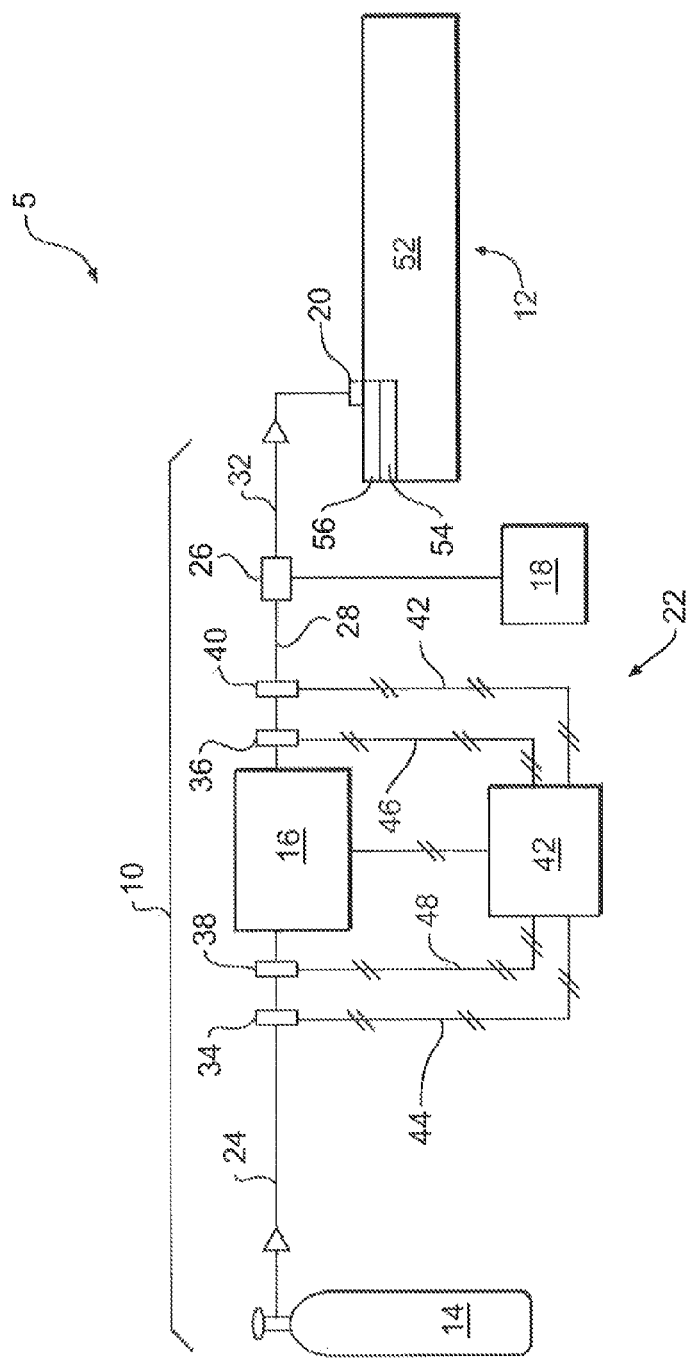
FIG. 1 is a diagrammatic illustration of an exemplary coolant supply system for a machining tool.

FIG. 1 illustrates an exemplary machining system 5 including a coolant supply system 10 and a machining tool 12. When a workpiece (not shown) is being machined by machining tool 12, temperatures at the interface between the workpiece and machining tool 12 may reach levels that may adversely affect or may even be harmful to the workpiece and machining tool 12. Coolant supply system 10 may supply a coolant fluid to machining tool 12 to prevent the temperature at the interface of the workpiece and machining tool 12 from exceeding desired levels. The coolant fluid may be any fluid capable of being maintained in a supercritical state at relatively moderate temperatures (i.e., approximately 70-95 degrees Fahrenheit) such as, for example, carbon dioxide.

A fluid in a supercritical state may exist as a gas but may have the density of a liquid. Such a property may be useful for cooling the machining interface between machining tool 12 and the workpiece because as a gas, the fluid may be easier to deliver to the interface site. In addition, with the density of a liquid, the fluid may provide more lubrication and have a greater affect on the temperature of the interface than an ordinary gas. Furthermore, because the fluid is in a gas state, it may evaporate after cooling the interface, which reduces cleaning and maintenance costs. A supercritical state may be achieved when the fluid is maintained above a critical temperature and a critical pressure. Both the critical temperature and the critical pressure may be relative to each other. For example, if carbon dioxide is maintained at approximately room temperature (approximately 75 degrees Fahrenheit), it may reach a supercritical state when its pressure is above approximately 1100 PSI.

Coolant supply system 10 may include components that collaborate to manipulate the coolant fluid into a supercritical state and deliver the supercritical fluid to machining tool 12. For example, coolant supply system may include a coolant storage device 14, a compressor 16, a lubricant source 18, a coupling 20, and a control system 22. It is contemplated that coolant supply system 10 may include additional and/or different components to manipulate the coolant fluid into a supercritical state and deliver the supercritical coolant fluid to machining tool 12, if desired.

Coolant storage device 14 may be any device capable of storing a coolant fluid and may include, for example, a high pressure gas tank or an expandable storage container. Coolant storage device 14 may be made of any material known in the art and may be rigid or flexible. Such materials may include, for example, steel, cast iron, copper, aluminum, titanium, and/or any alloys or combinations thereof. In addition, coolant storage device 14 may also be made from plastic, rubber, vinyl, polytetrafloroethylene, expanded polytetrafloroethylene, or some derivative or combination thereof. In yet another alternative, coolant storage device 14 may be made from a combination of any of the metals and/or nonmetals described above.

Coolant storage device 14 may be fluidly connected to compressor 16 via a fluid passage 24. Fluid passage 24 may be any type of tubing, piping, or hose known in the art and may include, for example, plastic, rubber, aluminum, copper, steel, or any other material capable of delivering a fluid in a controlled manner, and may be flexible or rigid. The length of fluid passage 24 may be minimized to facilitate operation of coolant supply system 10, while reducing the pressure drop between the components thereof.

Compressor 16 may increase pressure of the coolant fluid until the coolant fluid is in a supercritical state. In addition, compressor 16 may include any type of compressor known in the art capable of a compressing a coolant fluid to supercritical level. For example, if the coolant fluid is carbon dioxide, compressor 16 may increase the pressure of the carbon dioxide to approximately 1100 psi. This range may be increased or decreased depending on the type and temperature of coolant fluid used. Furthermore, compressor 16 may deliver a substantially constant, substantially uniform flow of coolant fluid to the machining tool 12. It is contemplated that if coolant storage device 14 stores the coolant fluid above the coolant fluid's supercritical pressure, compressor 16 may be omitted and the coolant fluid may be delivered to machining tool 12 directly from coolant storage device 14.

After being pressurized to the desired pressure, the coolant fluid may be directed to a mixing valve 26 via a fluid passage 28 where the coolant fluid may be mixed with a lubricant from lubricant source 18. Lubricant source 18 may be any source capable of storing or supplying a lubricant such as, for example, a tank or other type of container. In addition, the lubricant may be any element capable of reducing friction encountered at an interface between machining tool 12 and a workpiece (not shown). For example, the lubricant may be oil.

Mixing valve 26 may be fluidly connected to lubricant source 18 via a lubricant passage 30. In addition, mixing valve 26 may include, for example, a butterfly valve element, a spool valve element, a check valve element, a gate valve element, a ball valve element, a globe valve element, or any other valve element known in the art. The valve element of mixing valve 26 may be movable between a flow-passing position and a flow-restricting position. The position of the valve element of mixing valve 26 between the flow-passing and flow-restricting positions may, at least in part, affect the amount of lubricant to mix with the coolant fluid. More specifically, mixing valve 26 may selectively allow, block, or partially block the flow of lubricant from lubricant source 18 to mix with the coolant fluid, thereby adjusting the composition of the resulting coolant fluid/lubricant mixture.

It is contemplated that in an alternate embodiment, the coolant fluid may be directed to machining tool 12 without being mixed with a lubricant. In such an embodiment, lubricant source 18, mixing valve 26, and lubricant passage 30 may be omitted.

After being mixed with the lubricant, the coolant fluid may be directed to coupling 20 via a fluid passage 32, which may be similar to fluid passage 24. Coupling 20 may provide a direct connection between coolant supply system 10 and machining tool 12. Coupling 20 may be sized and otherwise designed to form a sealed connection regardless of the pressure of the coolant fluid being directed to machining tool 12.

Control system 22 may regulate the pressure of the coolant fluid and may include sensors 34, 36, 38, and 40 for sensing various parameters indicative of the temperatures and pressures of the coolant fluid at various locations within coolant supply system 10. Control system 22 may also include a controller 42 for regulating the operation of compressor 16 in response to signals received from sensors 34, 36, 38, and 40. It is contemplated that control system 22 may include additional sensors for sensing other parameters that may be useful to regulate the pressure of the coolant fluid.

Sensor 34 may be located anywhere within fluid passage 24 upstream of compressor 16, and sensor 36 may be located anywhere within fluid passage 28 downstream of compressor 16. Sensors 34, 36 may include one or more devices for sensing a parameter indicative of a temperature of the coolant fluid. In addition, sensors 34, 36 may include any type of temperature sensing device known in the art. For example, sensors 34, 36 may include surface-type temperature sensing devices that measures a wall temperature of fluid passages 24, 28, respectively. Alternately, sensors 34, 36 may include a gas-type temperature sensing device that directly measures the temperature of the coolant fluid within fluid passages 24, 28, respectively. Upon measuring the temperature of the coolant fluid, sensors 34, 36 may generate coolant fluid temperature signals and send these signals to controller 42 via communication lines 44 and 46, respectively, as is known in the art. These temperature signals may be sent continuously, on a periodic basis, or only when prompted to do so by controller 42, if desired. Furthermore, it is contemplated that either sensor 34 or sensor 36 may be omitted, if desired. It is further contemplated that sensors 34, 36 or additional sensors (not shown) may be located downstream of mixing valve 26 within fluid passage 32.

Sensors 38, 40 may any type of pressure sensing device known in the art. Upon measuring the pressure of the exhaust gas, sensors 38, 40 may generate coolant fluid pressure signals and send this signals to controller 42 via communication lines 48, 50, respectively, as is known in the art. This pressure signal may be sent with or independent of the above-mentioned temperature signal. Furthermore, the pressure signal may be sent continuously, on a periodic basis, or only when prompted to do so by controller 42.

Controller 42 may include one or more microprocessors, a memory, a data storage device, a communication hub, and/or other components known in the art. Controller 42 may receive signals from sensors 34, 36, 38, and 40 and analyze the data to determine whether the coolant fluid is in a supercritical state. If the pressure of the fluid is not above the supercritical pressure related to the current temperature of the coolant fluid, controller 42 may compare data received from sensors 34, 36, 38, and 40 to algorithms, equations, subroutines, reference look-up maps or tables and establish an output to influence the operation of compressor 16. For example, if the pressure of the coolant fluid is below the critical pressure related to the current temperature of the coolant fluid, controller 42 may cause compressor 16 to increase the pressure of the coolant fluid.

Machining tool 12 may include multiple components that cooperate to modify a workpiece. In particular, machining tool 12 may include a shank 52, a seat 54, and an insert 56. For the purposes of this disclosure, machining tool 12 is depicted as a cutting tool of a turning machine (not shown). One skilled in the art will recognize, however, that machining tool 12 may be any other type of tool used to remove material from a workpiece such as, for example, a boring tool, a drilling tool, a milling tool, etc.

Shank 52 and seat 54 may provide a support for insert 56, which may be used to remove material from the workpiece. In addition, shank 52 may connect seat 54 and insert 56 to the rest of the turning machine. Furthermore, insert 56 may be secured to shank 52 via seat 54. Shank 52, seat 54, and insert 56 may be made from any type of material such as, for example, ceramics, titanium, steel, etc.

FIGS. 2 and 3 illustrate a top and a side view of an exemplary embodiment of machining tool 12, respectively. As can be seen, insert 56 may be secured to seat 54 and shank 52 via a securing device 58. Securing device 58 may be any type of device used to mechanically secure components together such as, for example, a lock pin, a screw, or a bolt. It is contemplated that any other method of securing insert 56 to seat 54 and shank 52 may be used, if desired. Such methods may include, for example, clamping or brazing. In addition, although insert 56 is illustrated having a triangular shape, insert 56 may have any other shape useful for removing material from a workpiece 60.

Insert 56 may include an interface surface 62, which may interact with workpiece 60. Such an interaction may include, for example, removing material from workpiece 60. Insert 56 may also include a coolant delivery system 64 for delivering the supercritical coolant fluid from coolant supply system 10 to workpiece 60. In addition, coolant delivery system 64 may include an insert passage 66 and one or more distribution passages 68.

Insert passage 66 may be fluidly connected to coupling 20 and may extend from coupling 20 to a location near interface surface 62. It is contemplated that the length of insert passage 66 may be related to the size of insert 56. For example, insert passage 66 may be longer for larger inserts 56 and may be shorter for smaller inserts 56. In addition, a cross-sectional area of insert passage 66 may be sized to maintain the coolant fluid flowing through insert passage 66 in a supercritical state. For example, if the coolant fluid is carbon dioxide, the cross-sectional diameter of insert passage 66 may be within a range of approximately 0.5 to 2.0 millimeters. Furthermore, insert passage 66 may include any type of material capable of withstanding the high pressures associated with the supercritical coolant fluid. For example, insert passage 66 may include high-pressure stainless steel tubing. It is contemplated that insert passage 66 may be secured within insert 56 by any method such as, for example, brazing. Alternatively, insert passage 66 may be a channel bored or electrodischarge machined (EDM'd) through insert 56.

Distribution passages 68 may be tubes bored through insert 56 and may be fluidly connected to the portion of insert passage 66 near interface surface 62. In addition, each distribution passage 68 may terminate at one of a plurality of openings 70 located on interface surface 62. The coolant fluid may flow through distribution passages 68 from insert passage 66 and exit insert 56 at openings 70, thereby lubricating and cooling workpiece 60. Distribution passages 68 and openings 70 may be positioned to maximize the surface area of workpiece 60 that may contact the coolant fluid. In addition, distribution passages 68 and openings 70 may be sized to maintain the coolant fluid in the supercritical state. For example, if the coolant fluid is carbon dioxide, each distribution passage 68 may have a cross-sectional diameter within a range of approximately 0.1 to 0.3 millimeters. Furthermore, the length of each distribution passage 68 may be no greater than approximately 1 millimeter.

FIGS. 4 and 5 illustrate a top and a side view of another exemplary embodiment of machining tool 12. Similar to the embodiment illustrated in FIGS. 2 and 3, insert 56 may be secured to seat 54 and shank 52 via securing device 58. However, a connecting passage 72 through which securing device 58 may be inserted may have a diameter large enough to create a clearance 74 between an inner edge of connecting passage 72 and an outer edge of securing device 58. Clearance 74 may be sized to permit the flow of a fluid while in a supercritical state. When securing device 58 is secured into shank 52, a head portion 76 of securing device 58 may abut a surface 78 of insert 56, thereby creating a seal that may substantially prevent any fluid from exiting connecting passage 72 through an upper opening 80. It is contemplated that a sealing material 82 may be situated adjacent upper opening 80 to further seal off upper opening 80, if desired. Sealing material 82 may be any pliable material such as, for example, foam, rubber, plastic, or any other material capable of creating a substantially air-tight seal.

The supercritical coolant fluid may enter connecting passage 72 from a shank passage 84 situated within shank 52. Shank passage 84 may be fluidly connected to coupling 20. A cross-sectional area of shank passage 84 may be sized to maintain the coolant fluid flowing through shank passage 84 in a supercritical state. For example, if the coolant fluid is carbon dioxide, the cross-sectional diameter of shank passage 84 may be within a range of approximately 0.5 to 2.0 millimeters. Furthermore, shank passage 84 may include any type of material capable of withstanding the high pressures associated with the supercritical coolant fluid. For example, shank passage 84 may include high-pressure stainless steel tubing. It is contemplated that shank passage 84 may be secured within shank 52 by any method such as, for example, brazing. Alternatively, shank passage 84 may be a channel bored or electrodischarge machined (EDM'd) through shank 52.

Insert 56 may include one or more interface surfaces 86, which may interact with workpiece 60 in a manner similar to the interaction between interface surface 62 and workpiece 60. Insert 56 may also include one or more coolant delivery systems 88 similar to coolant delivery system 64 illustrated in FIGS. 2 and 3. Although insert 56 may include multiple coolant delivery systems 88, only the coolant delivery system 88 associated with the interface surface 86 interacting with workpiece 60 may deliver coolant fluid to workpiece 60. In addition, each coolant delivery system 88 may include an insert passage 90 and one or more distribution passages 92.

Each insert passage 90 may be fluidly connected to connecting passage 72 and may extend to a location near one of the interface surfaces 86 of insert 56. Similar to insert passage 66, each insert passage 90 may be sized to maintain the coolant fluid flowing through insert passage 90 in a supercritical state. For example, if the coolant fluid is carbon dioxide, the cross-sectional diameter of insert passage 90 may be within a range of approximately 0.5 to 2.0 millimeters. Furthermore, insert passage 90 may include any type of material capable of withstanding the high pressures associated with the supercritical coolant fluid. For example, insert passage 90 may include high-pressure stainless steel tubing. It is contemplated that insert passage 90 may be secured within insert 56 by any method such as, for example, brazing. Alternatively, insert passage 90 may be a channel bored or electrodischarge machined (EDM'd) through insert 56.

Similar to distribution passages 68, each distribution passage 92 may be a tube bored through insert 56 and may be fluidly connected to an end of one of the insert passages 90 at a location near one of the interface surfaces 86. In addition, each distribution passage 92 may terminate at one of a plurality of openings 94 located on each interface surface 86. Distribution passages 92 associated with the interface surface 86 interacting with workpiece 60 may direct the supercritical coolant fluid to workpiece 60, thereby cooling and lubricating workpiece 60. However, shank 52 may restrict the flow of coolant fluid through the openings 94 associated with the other distribution passages 92. One or more surfaces 96 of shank 52 may contact and substantially seal openings 94, thereby substantially preventing any supercritical coolant fluid from exiting such distribution passages 92. This configuration may ensure that substantially all of the supercritical coolant fluid flowing through machining tool 12 may be applied to workpiece 60.

Each distribution passage 92 and opening 94 may be sized to maintain the coolant fluid in the supercritical state. For example, if the coolant fluid is carbon dioxide, each distribution passage 92 may have a cross-sectional diameter within a range of approximately 0.1 to 0.3 millimeters. In addition, the length of each distribution passage 68 may be no greater than approximately 1 millimeter. Furthermore, distribution passages 92 and openings 94 may be positioned to maximize the surface area of workpiece 60 that may contact the coolant fluid.

INDUSTRIAL APPLICABILITY

The disclosed tool may adequately lubricate and cool the surfaces of a tool and a workpiece that interact with each other during a machining process by delivering a supercritical coolant fluid to the interfacing surfaces. In particular, more coolant fluid may be applied to the interface because the supercritical fluid has the density of a liquid. In addition, the coolant fluid may be more uniformly applied to the interface between the tool and the workpiece because the supercritical fluid is a gas.

Maintaining the pressure of a coolant fluid above its critical pressure may improve the performance of the cooling system. In particular, a single fluid stream of supercritical fluid may be both the propellant and the coolant because a supercritical fluid is a gas with the density of a liquid. This may eliminate the need to mix a separate propellant and a separate coolant to create a fluid adequate for lubricating and cooling the interface between the workpiece and the cutting tool. This may increase the predictability of the coolant's effect on the interface. With an increased predictability, the supercritical fluid may perform more consistently, which may improve the performance of the cooling system.

In addition, directing the supercritical fluid through the insert may increase the efficiency of the supercritical fluid. This may be because directing the supercritical fluid through the insert may reduce the distance between the delivery point of the supercritical fluid and the interface between the tool and the workpiece. Reducing the distance between the delivery point and the interface may minimize the rise temperature of the supercritical fluid. Furthermore, reducing the distance between the delivery point and the interface may minimize the effect the ambient air surrounding the tool and workpiece may have on the supercritical fluid, thereby reducing the amount of supercritical fluid that may be directed away from the interface. With a lower temperature and large percentage of the supercritical fluid reaching the interface, less fluid may be needed, thereby increasing the efficiency of the fluid.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A method for machining a workpiece, comprising:
   manipulating a fluid to exist in a supercritical state;
   directing the fluid through an insert of a machining tool while maintaining the fluid in the supercritical state;
   using the insert to remove a portion of the workpiece; and
   directing the fluid to an interface surface of the insert that is interacting with the workpiece while maintaining the fluid in the supercritical state.

2. The method of claim 1, further including sensing a first parameter indicative of a temperature of the fluid and sensing a second parameter indicative of a pressure of the fluid.

3. The method of claim 2, wherein manipulating the fluid includes adjusting the pressure of the fluid in response to the sensed temperature so that the fluid is maintained in a supercritical state.

4. The method of claim 3, further including mixing a lubricant with the supercritical fluid.

5. The method of claim 4, wherein the fluid is carbon dioxide.

6. The method of claim 4, further including selectively mixing the lubricant with the supercritical fluid to adjust a composition of a resulting mixture of the lubricant and the supercritical fluid.

7. The method of claim 2, further including comparing the sensed first parameter and sensed second parameter to at least one of: algorithms, equations, subroutines, reference look-up maps, and tables.

8. The method of claim 7, further including using the comparison of the sensed first parameter and sensed second parameter to adjust the pressure of the fluid.

9. The method of claim 1, wherein the fluid in the supercritical state exists as a gas when it is directed to the interface surface of the insert that is interacting with the workpiece.

10. A method for machining a workpiece, comprising:
pressurizing a fluid to a desired pressure such that the fluid exists in a supercritical state as a gas;
directing the fluid through a machining tool while maintaining the fluid in the supercritical state;
using the machining tool to remove a portion of the workpiece; and
directing the fluid to an interface surface of the machine tool that is interacting with the workpiece while maintaining the fluid in the supercritical state.

11. The method of claim 10, wherein directing the fluid to an interface surface of the machine tool that is interacting with the workpiece includes directing the fluid through one or more distribution passages in the machining tool.

12. The method of claim 11, wherein the one or more distribution passages have a length no greater than 1 millimeter.

13. The method of claim 11, wherein the one or more distribution passages have a cross-sectional diameter ranging from 0.1 millimeter to 0.3 millimeter.

14. The method of claim 10, further including delivering a substantially constant, substantially uniform flow of the fluid to the machining tool.

15. The method of claim 10, wherein the fluid is carbon dioxide and the desired pressure is above approximately 1,100 psi, and wherein a temperature of the fluid is approximately 75 degrees Fahrenheit.

16. A method for machining a workpiece, comprising:
manipulating a fluid to exist in a supercritical state, wherein a temperature of the fluid is above a critical temperature and a pressure of the fluid is above a critical pressure;
directing the fluid through a machining tool;
using the machining tool to remove a portion of the workpiece; and
directing the fluid to an interface surface of the machine tool that is interacting with the workpiece while maintaining the fluid in the supercritical state.

17. The method of claim 16, wherein manipulating the fluid to exist in a supercritical state includes sensing a first parameter indicative of the temperature of the fluid and a second parameter indicative of the pressure of the fluid.

18. The method of claim 17, further including determining if the pressure of the fluid is below the critical pressure based on the sensed first and second parameters.

19. The method of claim 16, wherein manipulating the fluid to exist in a supercritical state includes sensing (1) a first temperature or a first pressure of the fluid upstream of a compressor and (2) a second temperature or a second pressure of the fluid downstream of the compressor.

20. The method of claim 16, wherein the machining tool includes an insert, a connecting passage, and a securing device inserted within the connecting passage; and wherein directing the fluid through the machining tool includes directing the fluid through a clearance between an inner edge of the connecting passage and an outer edge of the securing device.

* * * * *